United States Patent [19]
Umeda et al.

[11] 4,426,964
[45] Jan. 24, 1984

[54] RUNNER-TYPE LUBRICATING DEVICE FOR VERTICAL ENGINE

[75] Inventors: Tatsutoshi Umeda, Kawachinagano; Yasunori Hashigaki, Sennan, both of Japan

[73] Assignee: Kubota, Ltd., Osaka, Japan

[21] Appl. No.: 360,147

[22] Filed: Mar. 22, 1982

[30] Foreign Application Priority Data

Jun. 5, 1981 [JP] Japan .............................. 56-83584[U]

[51] Int. Cl.³ .......................... F02F 7/00; F02B 77/00
[52] U.S. Cl. ............................. 123/195 A; 123/198 C; 123/196 R; 184/6.5; 184/13.1
[58] Field of Search .......... 123/195 A, 198 C, 196 R; 184/6.5, 11 R, 13 R; 417/364

[56] References Cited

U.S. PATENT DOCUMENTS

| 1,562,642 | 11/1925 | Holmstrom | 184/13 R |
| 2,669,322 | 2/1954 | Brown | 184/13 R |
| 3,028,848 | 4/1962 | Catterson | 184/11 R |
| 3,144,097 | 8/1964 | Ebert | 184/13 R |
| 4,114,586 | 9/1978 | Fujikawa et al. | 123/195 A |
| 4,334,508 | 6/1982 | Sasaki | 123/195 A |

Primary Examiner—Charles J. Myhre
Assistant Examiner—E. Rollins Cross
Attorney, Agent, or Firm—Edwin E. Greigg

[57] ABSTRACT

A runner-type lubricating device for a vertical engine, in which a power gear is secured to a rotary shaft and properly meshed with a driven gear secured to a runner, with a bracket for pivotally supporting the runner secured to a crank case by a fixing means.

3 Claims, 4 Drawing Figures

RUNNER-TYPE LUBRICATING DEVICE FOR VERTICAL ENGINE

BACKGROUND OF THE INVENTION

1. Field of the Invention

The present invention relates to a runner-type lubricating device for vertical engine.

The term of a vertical engine means an engine in which the engine cylinder is horizontal and the power take-off rotary shaft driven by a crank arm is adapted to become vertical when the engine is mounted to a working machine. Engines of such construction are generally used for outboard machines or tillers of small size.

2. Description of the Prior Art

As shown in FIG. 1 for example, there is conventionally known a lubricating device which comprises a crank case 2 for a vertical engine 1, an oil pan 3 for closing the lower end of the opening of the crank case 2, a runner 4 disposed in the oil pan 3 so as to have a horizontal or slightly inclined axis of rotation, a power gear 6 secured to a rotary shaft 5 vertically and pivotally supported in the crank case 2, and a driven gear 7 secured to the runner 4 and meshed with the power gear 6.

In such a conventional device, however, a bracket 8 for rotatably supporting the runner 4 is secured to the oil pan 3. Therefore, in order to mesh the driven gear 7 with the power gear 6, the runner 4 and the driven gear 7 are slid together with the oil pan 3 with trials and errors repeated. Thus, assembling efficiency and accuracy are both lowered, and the gears 6 and 7 may disadvantageously exhibit undercut and uneven wear, thereby to lower their durability.

In order to eliminate such defects, we have proposed a lubricating device, for example, as shown in FIG. 2, in which a bracket 8" for pivotally supporting a runner 4 is pivotally supported by a rotary shaft 5 and received by a rib 9 in an oil pan 3 to prevent the bracket 8" from rotating around the rotary shaft 5.

In such a lubricating device, however, assembling of the bracket 8" to the rib 9 in the oil pan 3 still requires a troublesome work with trials and errors repeated as conventionally done. It cannot be said, therefore, that such device fully eliminates the conventional defects.

SUMMARY OF THE INVENTION

It is an object of the present invention to provide a lubricating device in which such engagement between the power gear and the runner as above-mentioned can be properly made and such inconveniency in assembling of the bracket and the rib in the oil pan as above-mentioned can be eliminated.

A runner-type lubricating device for vertical engine in accordance with the present invention including a crank case closed at the lower end of the opening thereof by an oil pan and an engine power take-off rotary shaft vertically journalled in the crank case, comprises a runner disposed in the oil pan so as to have a horizontal or slightly inclined axis of rotation, a bracket for rotatably supporting the runner, a fixing means for fixing the bracket to the crank case, a power gear secured to the rotary shaft, and a driven gear disposed on the runner and meshed with the power gear.

According to the present invention, the bracket for pivotally supporting the runner is secured to the crank case by the fixing means. Such arrangement enables the runner to be installed prior to the assembling of the oil pan such that the power gear and the driven gear are properly meshed, while visually confirming the engagement therebetween. This facilitates the whole assembling work in an accurate and efficient manner, and can prevent a lowering of durability of the gears or the runner which is resulted from excessive or deficient engagement between the power gear and the driven gear.

Substantially, the present invention can be realized by merely changing the bracket mounting position from the oil pan to the crank case. Thus, the present invention can be embodied readily and economically.

Other objects and advantages of the present invention will be apparent from the following description thereof.

BRIEF DESCRIPTION OF THE DRAWINGS

The present invention will be further described, by way of example, with reference to the accompanying drawings, in which.

DESCRIPTION OF THE PREFERRED EMBODIMENT

Figure 1:
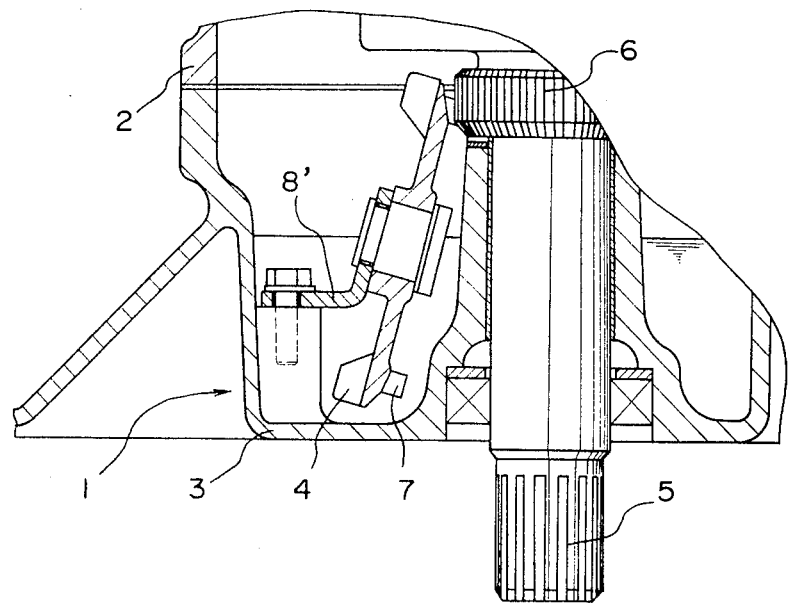
FIG. 1 is a longitudinal section view of main portions of a conventional lubricating device.
Figure 2:
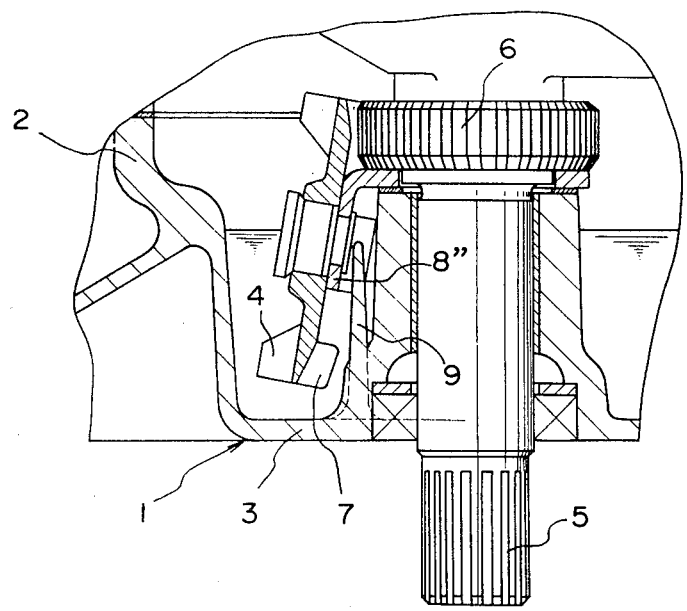
FIG. 2 is a longitudinal section view of main portions of another conventional lubricating device of the improved type.
Figure 3:
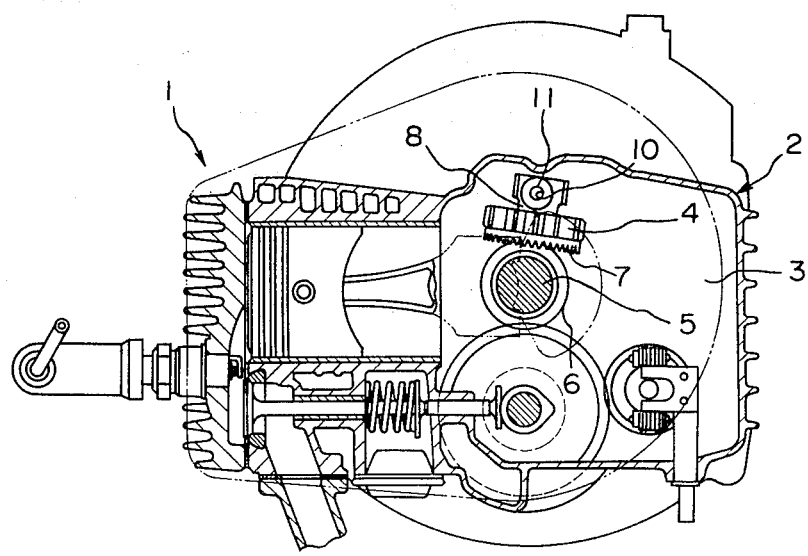
FIG. 3 is a section view in plan elevation of an embodiment of the present invention.
Figure 4:
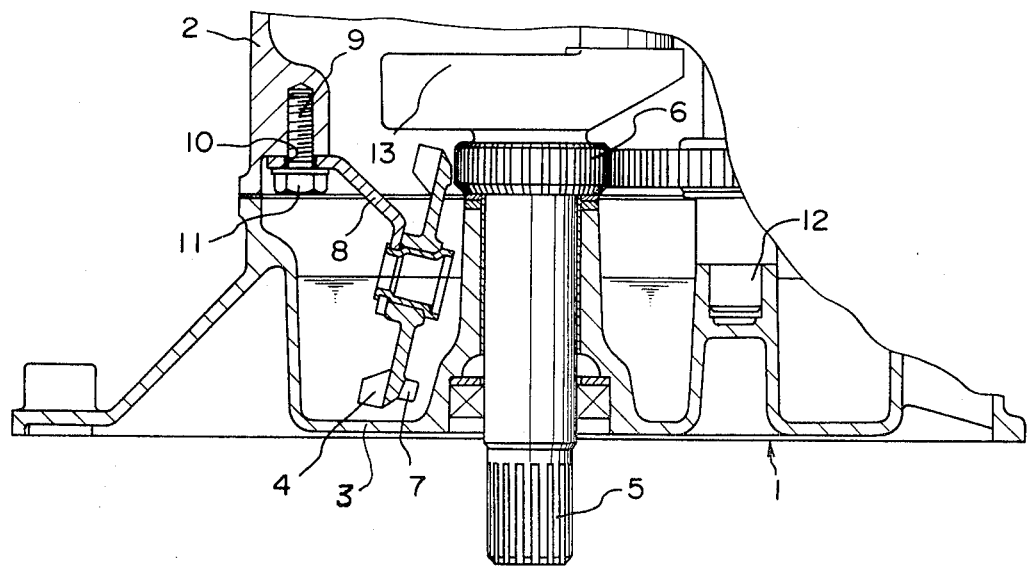
FIG. 4 is a section view in side elevation of FIG. 3.

As shown in FIGS. 3 and 4, a runner-type lubricating device for a vertical engine 1 in accordance with the present invention comprises a crank case 2 closed at the lower end of the opening thereof by an oil pan 3, a runner 4 having a slightly inclined axis of rotation and disposed in the oil pan 3, a rotary shaft 5 vertically and pivotally supported in the crank case 2, and a power gear 6 (which is a spur gear) secured to the rotary shaft 5.

A driven gear 7 is secured to one end of the runner 4. The runner 4 and the driven gear 7 are rotatably pivoted to the bracket 8.

The crank case 2 has in the lower end surface thereof a threaded hole 9. The bracket 8 may be secured to the crank case 2 by threadedly fastening a fixing means 11 into the threaded hole 9, the fixing means 11 comprising a bolt passed through a through hole 10 formed in the mounting end portion of the bracket 8. As necessary, the hole 10 may be formed in a slot or a circular hole having a diameter larger than that of the leg portion of the fixing means 11. By properly adjusting the bracket fixing position, the power gear 6 can be properly meshed with the driven gear 7 neither too much nor too less.

Although in the present embodiment, the rotary shaft 5 is constituted by a crank shaft, such rotary shaft may be constituted by a cam shaft 12 or a balancing weight shaft (not shown).

The runner 4 is disposed such that a lubricating oil is jumped up within the range defined from the crank arm to the counter weight in which a vertical shaft rotating member 13 is rotated, but the directions to which a lubricating oil is jumped up are not limited in the present embodiment.

We claim:

1. An improved support for improving the relative relationship between a runner-type lubricating device and a power gear secured on a vertically supported rotary shaft of a vertical drive type engine which engine includes a crank case with an oil pan enclosure secured to said crank case, the improvement comprising a bracket, said runner-type lubricating device being mounted to said bracket near one end thereof and is rotatable relative to said power gear, said bracket including an aperture near another end thereof, fixing means extending through said aperture and extending into said crank case which secures said bracket to said crank case with said runner-type lubricating device extending into said oil pan and positioned relative to said power gear for lubricating said power gear.

2. The device as set forth in claim 1, wherein said fixing means comprises a bolt, and said aperture in said bracket has a diameter larger than that of said bolt.

3. The device as set forth in claim 1, wherein said aperture is formed as a slot which is long in the direction along which said driven gear is moved toward or away from said power gear according to the movement of the bracket.

* * * * *